US007602885B2

(12) United States Patent
Afzal et al.

(10) Patent No.: US 7,602,885 B2
(45) Date of Patent: Oct. 13, 2009

(54) AUTOMATIC PROVISIONING OF A TELEPHONE LINE TEST SYSTEM

(75) Inventors: Muhammad Akbar Khan Afzal, Elk Grove Village, IL (US); Daniel Edward Mueller, Evanston, IL (US); Arthur Alamo, Milwaukee, WI (US)

(73) Assignee: Tollgrade Communications, Inc., Wilmington, DE (US)

( * ) Notice: Subject to any disclaimer, the term of this patent is extended or adjusted under 35 U.S.C. 154(b) by 275 days.

(21) Appl. No.: 11/322,105

(22) Filed: Dec. 29, 2005

(65) Prior Publication Data

US 2007/0153981 A1 Jul. 5, 2007

(51) Int. Cl.
H04M 1/24 (2006.01)
H04M 3/22 (2006.01)

(52) U.S. Cl. .................. 379/24; 379/1.01; 379/1.04; 379/22; 379/29.01

(58) Field of Classification Search ............... 379/1.01, 379/1.04, 22, 24, 26.01, 27.01, 29.01
See application file for complete search history.

(56) References Cited

U.S. PATENT DOCUMENTS

2003/0063712 A1* 4/2003 Chattell et al. ............ 379/26.01
2006/0159231 A1* 7/2006 Vitanza et al. ............. 379/1.01

FOREIGN PATENT DOCUMENTS

WO  WO 0176209 A1  10/2001

OTHER PUBLICATIONS

Teradyne, Inc., Celerity-4TEL, "LDU 100 Commissioning and Customer Acceptance Guide," Issue 2, D19-001-06, pp. cover, i-ii, 27-36,.
International Search Report from1 PCT/US2006/062007 dated May 16, 2007.

* cited by examiner

Primary Examiner—Ahmad F Matar
Assistant Examiner—Nafiz E Hoque
(74) Attorney, Agent, or Firm—The Webb Law Firm (57) ABSTRACT

A telephone line test system that may be used to compute line length of subscriber lines connected to a central office or other distribution point. When initially installed, the test system may automatically compute CO limits. The CO limits are computed from single-ended measurements on subscriber lines and represent electrical effects of the path between a test head and the distribution point. These CO limits are used to more accurately compute the length of lines connected to the distribution point using measurements made by the test system. Because the process uses single-ended measurements, it may be run in background mode during the initial installation of the test system or at any subsequent time it is desired to update the CO limits.

17 Claims, 3 Drawing Sheets

AUTOMATIC PROVISIONING OF A TELEPHONE LINE TEST SYSTEM

BACKGROUND OF INVENTION

1. Field of Invention

This invention relates generally to telephone line test systems and more specifically to provisioning a line test system.

2. Discussion of Related Art

Line test systems are widely used by telephone operating companies to increase the quality and reduce the cost of telephone service. 4TEL™ and Celerity® telephone line test systems provided by Teradyne, Inc of Deerfield, Ill., are examples of such systems.

A line test system typically consists of a test system controller and multiple test heads that may each be connected to a group of subscriber lines. To test a subscriber line, a test head takes measurements of multiple electrical characteristics of that subscriber line. These measurements are analyzed in the test system controller, which generates test results.

The type of analysis and the type of results generated depend on the reasons for conducting the test. In some instances, the test is performed in response to a report from a particular subscriber of a problem with their telephone service. In these instances, the test results may be used to identify a physical defect on a subscriber line that needs to be repaired. Additionally, the test results may indicate a location within the telephone network of a defect. Defect location information is useful to the telephone operating company because it aids in dispatching a repair person to repair the subscriber line.

Other testing scenarios arise because telephone operating companies want to use subscriber lines to carry high speed data signals instead of or in addition to voice information. However, high speed data signals have different characteristics than voice signals and a subscriber line that is capable of carrying a voice signal may not reliably carry a high speed data signal. Line test results may be used to predict whether a particular subscriber line will be able to carry high speed data signals or to predict the data rate that a particular subscriber line will support.

Many of the test results generated using a line test system depend on an estimate of the length of a subscriber line under test. For example, the length of a subscriber line may be used in identifying the location of a physical defect to better direct a repair person to the site where repairs are needed. An estimate of the length of a line may also be used in predicting the ability of the line to carry high speed data signals. Because long lines may attenuate high speed data signals too much for accurate transmission, the length of the line often is a good indicator of the types of signals that may be transmitted on the line.

To enable the test head to be switched to one subscriber line, in a typical test system the test head is installed in a central office, which contains a switch connected to multiple subscriber lines. To run a test, the test head is connected to a selected subscriber line through the switch. A drawback of such a configuration is that the path from the test head to the subscriber line under test passes through the switch, a distribution unit and cabling within the central office. Much of that path between the test head and the distribution unit is not used to carry signals when the telephone network is in normal operating. Therefore, it is often preferable to know the length of the line from the distribution point without the impact of the portion of the path between the test head and the distribution point.

To increase the accuracy of line length estimates, it is known to estimate the effects of a path between the test head and the distribution unit. Values representing this path can be subtracted from measurements made on a line under test to produce line measurements that more accurately reflect the subscriber line as it is used. The amount by which the path through the central office impacts measurements of the line is sometimes reflected as "CO limits." When installing, or provisioning, a test system, the CO limits are sometimes determined and stored in the test system controller. The CO limits can then be subtracted from measurements made with the test head so that an estimated line length more accurately reflects the actual length of a subscriber line.

As a test system is provisioned, it is known to make measurements of equipment and cabling in the central office to determine the effect of that equipment and cabling on subscriber line measurements made with a test head installed at the central office. This process involves making measurements on multiple lines. Some of these measurements are two-ended, meaning that measurements are made with a device at one end of the line while either a signal or operating state on the line is altered in another location. For example, a fault condition may be introduced on the line and measurements made while the line is in this fault state. Two-ended measurements require test equipment in at least two locations, and frequently require people in multiple locations.

SUMMARY OF INVENTION

In one aspect, the invention relates to a method of provisioning a network with a test system. The test system is configured to connect through a switching system to a distribution point at which a plurality of lines are connected to the switching system. The test system is adapted to estimate a length of a selected line of the plurality of lines. The method involves automatically measuring electrical properties on each of a plurality of paths and automatically selecting a portion of the plurality of the paths through the switching system. The measured electrical properties for the selected portion of the plurality of paths are used to compute at least one offset value to apply as an offset to measurements of the length of the selected line.

In another aspect, the invention relates to a test system adapted to compute a length of a line selected from a plurality of lines. The plurality of lines are connected to a distribution point where the lines are coupled to a switching system. The test system comprises a measurement unit, adapted to receive a command identifying a selected line; connect through the switching system to the selected line; and obtain electrical measurements of the selected line. The test system also includes a controller, adapted to receive the electrical measurements from the measurement unit. The controller comprises a computer readable medium having computer-executable instructions for performing steps of: sending a plurality of commands to the measurement unit, each command identifying a line as the selected line; receiving from the measurement unit electrical measurements made in response to each of the plurality of commands; and computing at least one offset value from the electrical measurements made in response to the plurality of commands, the offset value being representative of the path between the measurement unit and the distribution point; and storing the at least one offset value.

In another aspect, the invention relates to a computer-readable medium having computer-executable instructions for controlling a test system to perform the steps of: obtaining measurements of electrical properties on each of a plurality of paths through a switching system; selecting, based on the measurements, a subset of the measurements; computing at least one offset value from the subset of the measurements; and applying the offset when computing a length of a line.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Current methods of provisioning test systems that compute line length estimates corrected for CO limits have several drawbacks. First, the provisioning process can be expensive because of the need for two-ended measurements. In addition, introducing fault conditions on a line in order to measure CO limits is undesirable because it can disrupt service for some subscribers. Therefore, it would be desirable to have an improved method of provisioning a test system.

Accordingly, we have developed an automated process for computing CO limits. These CO limits may be computed from measurements taken with a test head under control of a test system controller. According to embodiments of the invention, CO limits are computed from single-ended measurements and can therefore be collected in an automated fashion without the need for intervention by a human technician. Further, because the measurements may be automated, they may be made in a background mode when the test system and subscriber lines are not in use.

Figure 1:
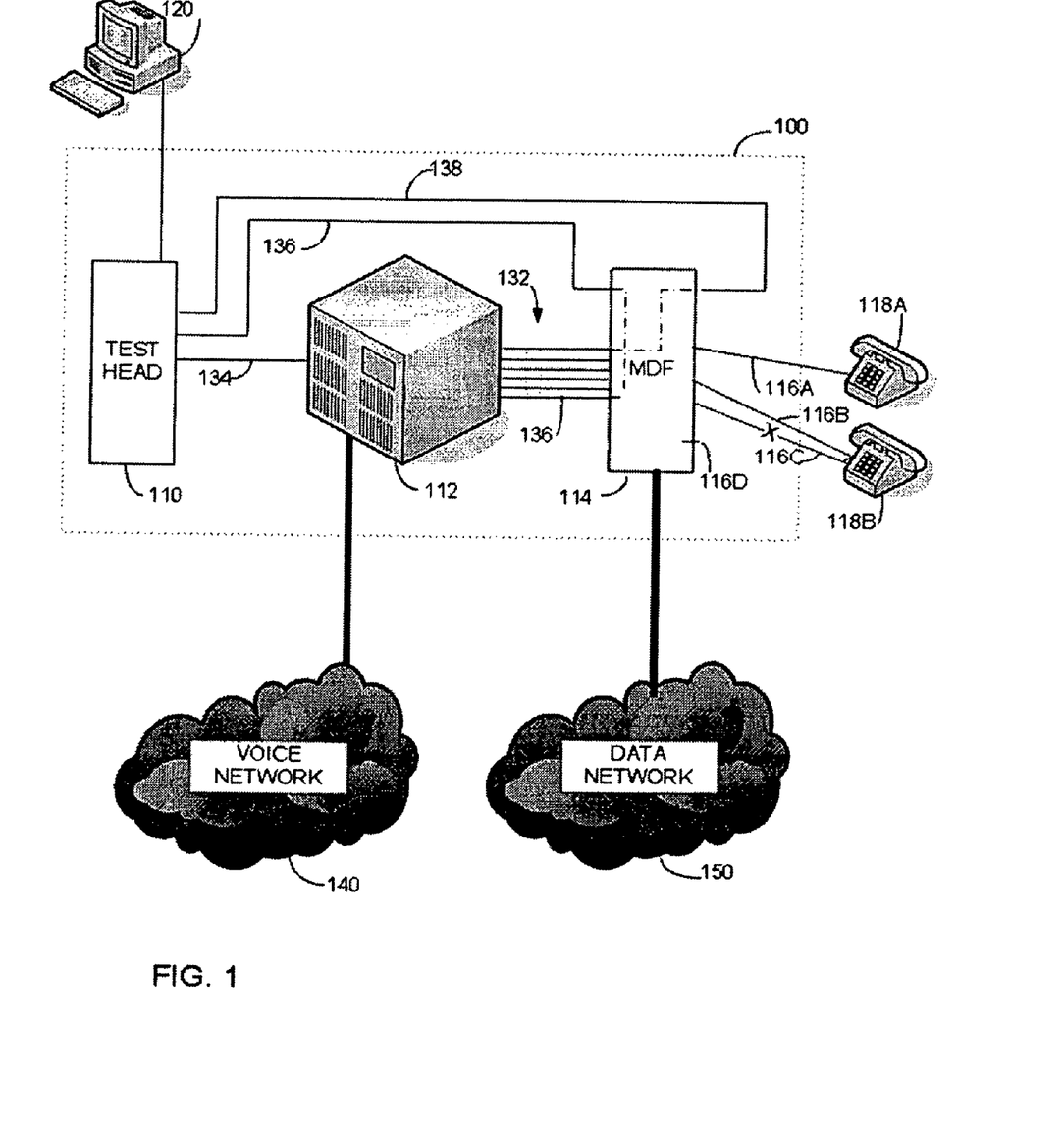
FIG. 1 is a sketch of a portion of a communication network according to an embodiment of the invention.

Turning to FIG. 1, a telecommunications network incorporating the invention is illustrated. In the network of FIG. 1, a test head 110 may be connected to individual subscriber lines 116A, 116B, 116C and 116D through switch 112. Each of the subscriber lines 116A . . . 116D may be connected to a subscriber's premises where a subscriber terminal, such as telephones 118A and 118B, may be connected to the subscriber line.

For clarity, FIG. 1 is a greatly simplified sketch of the telecommunications network. For example, four subscriber lines 116A . . . 116D are shown. A single switch such as central office switch 112 may connect to hundreds or thousands of subscriber lines. Further, subscriber terminals, such as 118A and 118B, are illustrated as traditional voice telephones, with one subscriber terminal per subscriber line. Subscriber terminals 118A and 118B may take on any form and there may be any number of subscriber terminals connected to each subscriber line. For example, a subscriber line may have connected to it multiple voice telephones and an ADSL splitter through which one or more computers is connected to the subscriber line. The number and uses of the subscriber lines is not a limitation of the invention.

FIG. 1 shows a central office 100 through which multiple subscribers may be connected to the telecommunications network. Through central office 100, each subscriber may be connected to a voice network 140 or a data network 150. Through the voice network 140, a subscriber may place or receive traditional voice telephone calls. Alternatively or additionally, a subscriber may access high-speed digital data services, such as ADSL, through data network 150. Though FIG. 1 shows a single central office for simplicity, a telecommunications network may have numerous central offices.

In the example of FIG. 1, each subscriber line 116A . . . 116D connects to central office 100 at a distribution point. FIG. 1 shows the distribution point to be provided by main distribution frame 114. Main distribution frame 114 is connected to switch 112 by a cable 132, which routes the subscriber lines such as 116A . . . 116D. In the simplified example of FIG. 1, a single cable 132 is shown. However, any number of cables, wires or other connections may be used to route subscriber lines to one or more distribution points.

Within switch 112, each of the subscriber lines connects to a line card (not shown). Each line card transmits and receives signals as appropriate for conducting a voice telephone call or otherwise providing telephone service. Switch 112 provides an interface between each line card and voice network 140 so that a subscriber connected to central office 100 may be connected any other subscriber that is also connected to voice network 140.

Some or all of the subscriber lines may also be connected to data network 150 to give subscribers access to data services. In the embodiment illustrated, subscriber lines intended to provide data services are connected to data network 150 at main distribution frame 114.

For testing subscriber lines, central office 100 may be equipped with a test system. The test system includes a test head 110 and a test system controller 120. As shown in FIG. 1, the test system controller 120 is coupled to test head 110, but need not be physically located within central office 100.

The connection between test head 110 and test system controller 120 allows test system controller 120 to control test head 110 to make measurements on selected subscriber lines and to receive results of those measurements. Test head 110 may generate and measure test signals of multiple forms. For example, test head 110 may measure voltages and currents and provide a range of AC and DC signals to stimulate subscriber lines during testing. Test head 110 may be a measurement unit as is conventionally used in a test system, such as the 4TEL™ test system, but any suitable measurement unit may be used.

The time at which measurements are taken and the specific measurements may be controlled by test system controller 120. In the embodiment of FIG. 1, test system controller 120 is illustrated as a desktop computer. Test system controller may be a general purpose desktop computer programmed to perform the functions described below. However, any suitable form of test system controller may be used.

Test system controller 120 receives and analyzes measurements made by test head 110. As in a conventional test system, test system controller 120 may be programmed to analyze the measurements and determine various parameters of a subscriber line under test. For example, test head 110 may measure the capacitance on a subscriber line, which test system controller 120 may use to estimate the length of that line. Test system controller 120 may use other measurements to compute other characteristics of the line, such as the type of termination. As in a conventional test system, test system controller 120 may use these measurements to determine whether there is a fault on the line, such as a short, an open or a resistive fault.

In the configuration illustrated in FIG. 1, test head 110 obtains access to individual subscriber lines 116A . . . 116D through switch 112. Conventionally, a central office switch includes a test access bus through which a test head may be connected to the switch and test head 110 may be connected through the test access bus. To allow test head 110 to be connected to the test access bus, switch 112, main distribution frame 114 and test head 110 may be interconnected with number test trunk 136. Number test trunk 136 passes from test head 110 through main distribution frame 114 back to switch 112. Within switch 112, number test trunk 136 may be switched to one of the line cards, allowing access to a selected subscriber line. In this way, switch 112 may couple signals generated by test head 110 on number test trunk 136 to the subscriber line connected to the selected line card. Conversely, switch 112 may couple signals received through the line card from the selected subscriber line to number test trunk 136, allowing the received signals to be passed back to test head 110.

Line 134 allows status and control signals to be passed between test head 110 and switch 112. These signals may, for example, request that switch 112 connect test head 110 to a specific subscriber line or communicate to test head 110 that a requested connection has been made.

The system may include a sample line 138. As shown in FIG. 1, sample line 138 is connected to a line card within switch 112. In a conventional test set-up, sample line 138 acts as a feedback path such that test head 110 may verify that the signals it generates are being properly transmitted through switch 112 and main distribution frame 114. A system may include more than one sample line, but only one is shown for simplicity.

As can be seen from FIG. 1, measurements made by test head 110 are influenced by electrical properties of the path through number test trunk 136, the test access bus within switch 112, cable 132 and main distribution frame 114. When such measurements are used to compute the length of a subscriber line, the resulting line length computation will not accurately reflect the distance the subscriber line extends from the distribution point. Often, the distance the line extends beyond the distribution frame is the desired line length. To provide more accurate line length measurements in these scenarios, it is conventional to subtract from any measurements made with test head 110 CO limits representing the effect of number test trunk 136, a test bus within switch 112, cable 132 and other components between the test head and the distribution point. The CO limits may be represented in any suitable form. The CO limits may be represented by an AC component and a DC component. To reflect that a network may pass signals at different frequencies differently, the AC component of the CO limits may be represented as sets of values, each set reflecting the effect of the path between the test head and the distribution frame at a specific frequency. In the described embodiment, the AC CO limits may be represented, at one frequency, by a pair of values $S_g$ and $S_p$, the susceptance-to-ground and the pair susceptance, respectively, introduced by equipment and cabling within the central office. However, any suitable quantities may be used to represent the CO limits.

In contrast to conventional test systems, test system controller 120 is programmed with computer executable instructions that can automatically compute CO limits. This process may be performed as part of provisioning the test system. Alternatively or additionally, this process may be performed at any time. at which installation parameters may change. For example, if a new switch or distribution unit is installed in a central office, the CO limits may be re-computed. Alternative or additionally, the process of automatically computing CO limits may be periodically performed after the test system is placed into service. In this way, changes in the operating environment may be automatically reflected in the CO limits to increase the accuracy of measurements made using the test system.

Figure 2:
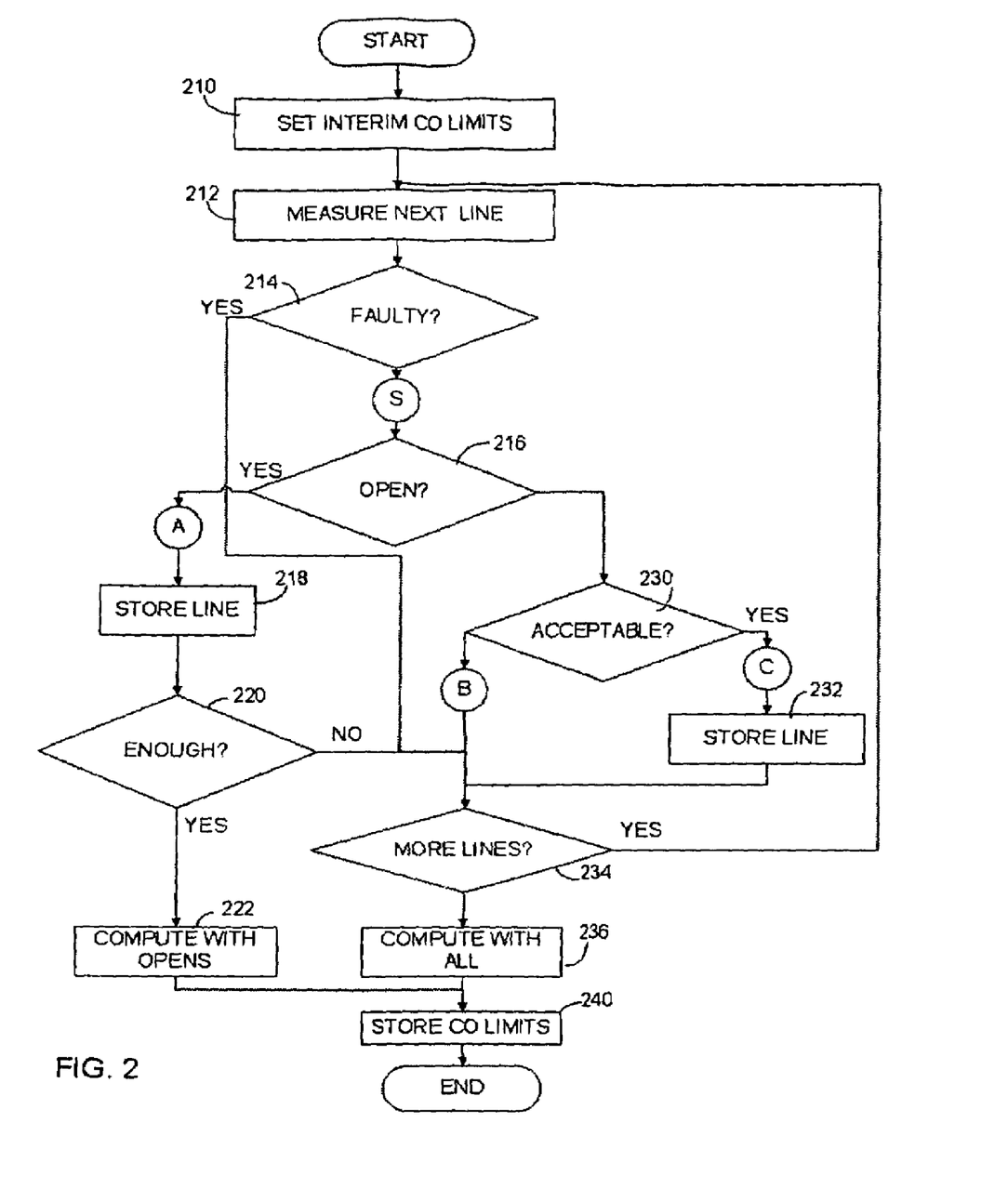
FIG. 2 is a flowchart of a process of setting CO limits according to an embodiment of the invention.

FIG. 2 illustrates a process that may be performed during the provisioning of a test system. The process illustrated in FIG. 2 may be performed under the control of test system controller 120. Accordingly, the process may be embodied as computer-executable instructions stored on a computer-readable medium either within test system controller 120 or accessible to test system controller 120. However, any suitable means may be used to compute the CO limits.

As shown in FIG. 2, the process begins after a test head 110 has been installed in a central office 100. In the pictured embodiment, the process will run in a "background mode." In background mode, test system controller 120 will control test head 110 to take measurements on subscriber lines connected to central office 100 when the subscriber lines and test system are not otherwise in use. Accordingly, it may take hours or days for the process to be completed. Until CO limits are computed, interim CO limits may be set for central office 100. While CO limits are being computed according to the process of FIG. 2, the interim limits may be used by test system controller 120 as an offset for measurements made with test head 110. In some embodiments, interim CO limits are determined empirically from measurements made in other central offices equipped with switches similar to switch 112. However, any suitable method of obtaining interim CO limits may be used.

Once interim CO limits are set, processing proceeds to block 212. At block 212, a subscriber line is selected and measurements are made on that line. In the embodiment of FIG. 2, subscriber lines are randomly selected. Random selection allows a subset of subscriber lines to be used to compute CO limits without concern that the subset of lines will be selected from a cluster of subscriber lines that have properties not representative of the full set of subscriber lines at the central office.

Measurements taken at block 212 may include measurements made by a conventional measurement units, including the "tip-to-ground" susceptance and "ring-to-ground" susceptance. Further, other or different measurements may be made. For example, measurements as conventionally made to allow test system controller 120 to detect a fault on the line may be made.

The selected subscriber line is then processed to determine whether it is "open" and whether it is "faulty." As described above in connection with FIG. 1, switch 112 includes multiple line cards, each of which may be connected to a subscriber line. In a telephone network, some subscriber lines will be connected through main distribution frame 114 to cables that connect the subscriber line to one or more subscriber terminals at a subscriber premises. Subscriber lines 116A and 116B illustrate subscriber lines connected to subscriber terminals. Other subscriber lines may contain faults and therefore not be in use. Subscriber line 116C illustrates a subscriber line with a fault that is not in use. Other subscriber lines may be in use because they are not yet connected to a cable running to a subscriber premises. Subscriber line 116D illustrates a subscriber line that is not connected outside of central office 100. Subscriber line 116D may be said to be "open" at the distribution point.

Selecting a line that is not faulty increases the accuracy of the computation of CO limits. Selecting an open subscriber line, such as subscriber line 116D, simplifies determination of the electrical properties of the subscriber line between the test head 110 and distribution frame 114. However, because the subscriber lines on which measurements are taken are selected randomly, the subscriber line selected at block 212 may not be an open subscriber line and could be faulty. Accordingly, subsequent steps in the process of FIG. 2 are directed at determining whether the measurements made at block 212 are suitable for use in computing CO limits.

Once the measurements at step 212 are made, processing proceeds to decision block 214. At decision block 214, a check is made whether the measurements indicate the selected subscriber line contains a fault. The determination of whether the line contains a fault may be made in test system controller 120 using conventional processing. However, any suitable method of detecting line faults may be employed. If the selected subscriber line contains a fault, measurements on that line are not used for computing CO limits. Accordingly, processing proceeds to decision block 234 where a determination is made whether there are more subscriber lines connected to switch 112 on which measurements may be made.

Conversely, if the measurements taken on the selected subscriber line do not indicate a fault, processing proceeds to decision block 216. At decision block 216, a determination is made whether the selected subscriber line is open at main distribution frame 114. Processing by which a line is deemed to be open is described in greater detail in conjunction with FIG. 3 below. Regardless of the specific processing employed at decision block 216, if the selected subscriber line is deemed to be open, processing continues to block 218.

At block 218, the measurements on the selected line are stored in a data structure containing measurements on open lines. This information may be used subsequently for computing CO limits.

Once the measurements are stored, processing proceeds to decision block 220. At decision block 220, a check is made of whether enough measurements have been stored on open lines to have a statistically significant sample of subscriber lines connected to switch 112. If not enough lines have been identified as open, processing proceeds to decision block 234 where a check is made of whether there are more lines for testing. Conversely, if enough lines have been identified as open, processing proceeds to block 222 where CO limits are computed based on measurements of lines deemed to be open at main distribution frame 114.

In the example embodiment, only AC CO limits are computed because DC CO limits have been found to be relatively uniform for all central office installations containing a particular type switch. Accordingly, the interim DC CO limits need not be changed based on subsequent measurements. Here, susceptance-to-ground and pair susceptance are computed at multiple frequencies to derive AC CO limits. The frequencies selected for computation of CO limits span the frequency range over which test head 110 operates and may be a set of discrete frequencies in this range.

Equations 1 and 2 illustrate formulas that may be used to compute susceptance-to-ground and pair susceptance, respectively, which may be used to define the AC CO limits. These equations may be used at each frequency for which a CO limit value is desired.

$$S_g = \Delta_g + \frac{1}{N}\sum_{n=1}^{N} \min[S_{tg}(n), S_{rg}(n)] \quad \text{EQ. (1)}$$

where N is the total number of subscriber lines for which measurements are available, $S_{tg}(n)$ and $S_{rg}(n)$ are the ground susceptance values with respect to tip and ring, respectively, for the $n^{th}$ subscriber line.

Tip-ring susceptance, or pair-susceptance ($S_p$), is calculated by Equation 2.

$$S_p = \Delta_p + \frac{1}{M}\sum_{m=1}^{M} \min[S_{tr}(m), S_{rt}(m)] \quad \text{EQ. (2)}$$

where M is the total number of subscriber lines used for the pair-susceptance calculation, and $S_{tr}(m)$ and $S_{rt}(m)$ are the susceptance values as measured from tip to ring and ring to tip, respectively, for the $m^{th}$ subscriber line deemed to be open at decision block 216. In the above equations, offset values $\Delta_g$ and $\Delta_p$ are determined empirically from measurements made in other installations. In the described embodiments, $\Delta_g$ and $\Delta_p$ may be constants, such as −10 and −4, respectively.

Processing then proceeds to block 240. At block 240, the values computed as the CO limits are stored for later use when processing measurements used to compute line length or other characteristics of a subscriber connected to switch 112. The values stored at block 240 may be used in the same fashion as CO limits stored in a conventional test system.

Conversely, if the selected subscriber line is determined at decision block 216 not to be open, processing proceeds from decision block 216 to decision block 230. At decision block 230, a determination is made as to whether the selected subscriber line is acceptable for use in computing CO limits even though it is not open at main distribution frame 114. The specific processing used at decision block 230 is described in more detail in connection with FIG. 3. Regardless of the specific processing used, if the line is deemed to be acceptable, processing proceeds to block 232.

At block 232, the measurements taken at block 212 are stored in a data structure (not shown) identifying lines that are not open but are nonetheless acceptable for computing CO limits. Thereafter, processing proceeds to decision block 234.

Conversely, if it is determined at decision block 230 that the line selected at block 212 is not acceptable for use in computing CO limits, processing proceeds directly to decision block 234.

Regardless of whether processing reaches decision block 234 from decision block 214, decision block 220, decision block 230 or from processing block 232, at decision block 234 a check is made of whether there are further lines connected to switch 112 that have not been measured. If further lines remain, processing loops back to block 212, where another subscriber line is randomly selected.

If no further lines remain, processing proceeds to block 236. At block 236, CO limits are computed using all of the lines deemed open for which measurements were stored at block 218. However, if processing reaches block 236, the number of lines deemed open is less than some threshold establishing a statistically significant sample size. To provide enough measurements for a reliable computation of CO limits, the computation at step 236 uses some or all of the measurements stored at block 232. In terms of the quantities in equations 1 and 2, N total lines measurements are used, of which M are "open" and N-M are not open, but are acceptable. In some embodiments, N equals twenty.

The processing at block 236 may compute a value of susceptance-to-ground ($S_g$) using the formula of Equation 1. Such processing will include measurements from open lines as well as acceptable lines.

At block 236, a pair susceptance ($S_p$) may also be computed. The pair susceptance may be computed using Equation 2. As described above, Equation 2 provides a formula for combining measurements on M lines. The measurements used in computing a pair susceptance according to Equation 2 are all made on open lines.

Once the values of $S_g$ and $S_p$ are computed, processing proceeds to block 240. At block 240, these values are stored for application as CO limits to measurements subsequently made with the test system. Storage and processing of the CO limits may be as in a conventional test system.

Figure 3:
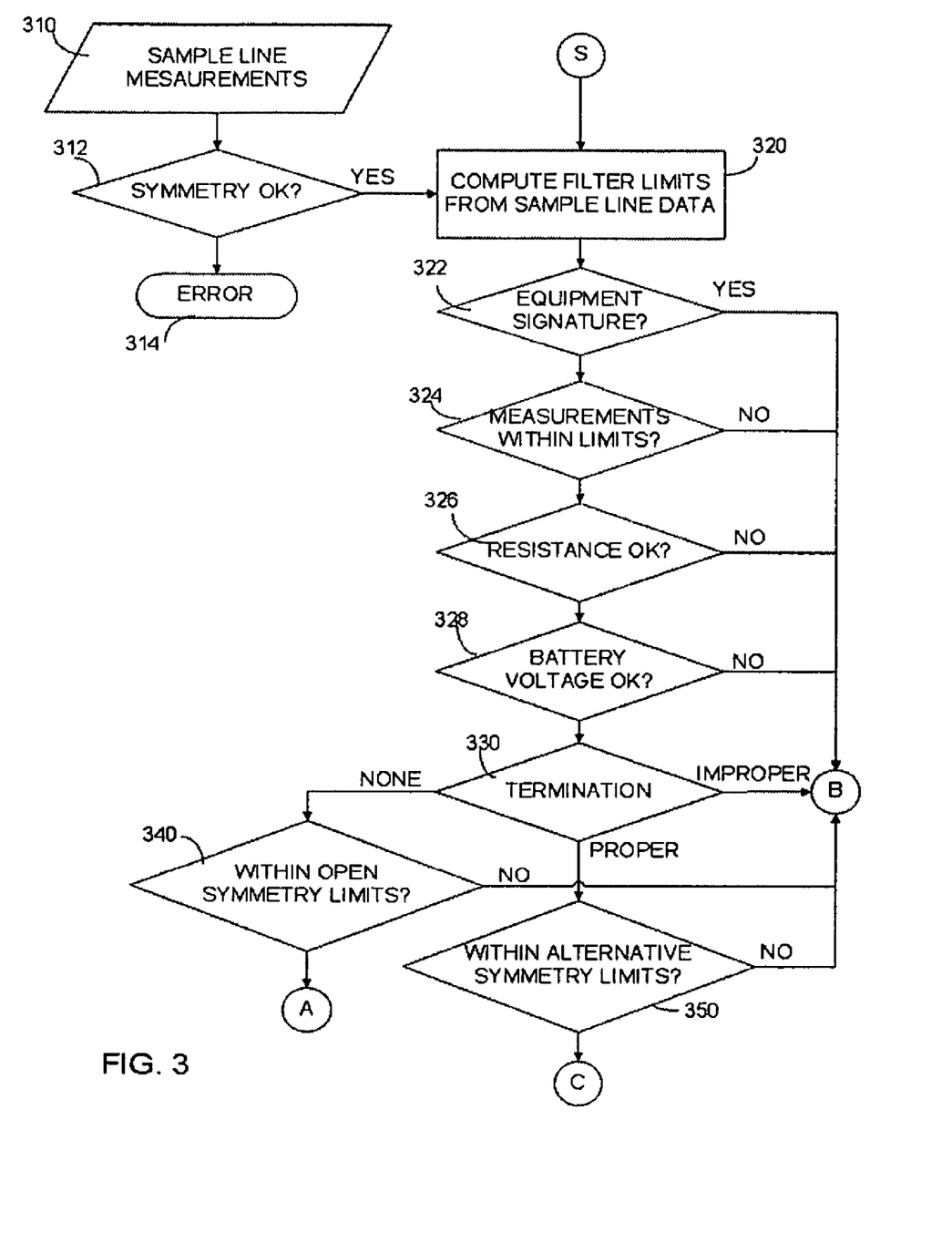
FIG. 3 is a flowchart showing in greater detail portions of the process of FIG. 2.

FIG. 3 shows in more detail a process by which lines are deemed to be open, acceptable for computing CO limits though not open or not acceptable for computing CO limits. The process in FIG. 3 is shown to have an entry point S and termination points A, B and C. FIG. 2 has similar points labeled S, A, B and C. The processing illustrated in FIG. 3 may be taken as a more detailed description of the processing between entry point S and the termination points A, B or C. Accordingly, the process of FIG. 3 may begin at entry point S after a measurement has been taken on a selected subscriber line. Also, the process of FIG. 3 may be performed following a preliminary determination that the selected subscriber line contains no fault.

The process of FIG. 3 begins at block 320. At block 320, filter limits are computed. As described below in connection with decision block 324, when measurements on a selected subscriber line fall outside the limits set at block 320, the selected subscriber line is deemed unacceptable for use in computing CO limits. In the described embodiment, filter limits are computed based on parameters of a sample line, such as sample line 138 (FIG. 1). Though FIG. 3 shows filter limits computed for each selected subscriber line, in some embodiments, the filter limits may be computed once for all selected subscriber lines.

FIG. 3 shows that parameters of the sample line 138 are obtained in a subprocess that includes process block 310, decision block 312 and error termination 314. As part of that subprocess, measurements are made on sample line 138 at block 310.

These measurements may be taken in the same way that measurements are taken on any subscriber line. Such measurements may be taken at any convenient time and need not be repeated each time a measurement on a subscriber line is processed. In the described embodiment, the measurements on the sample line taken at block 310 include the tip-to-ground susceptance ($S_{tg}$) and the ring-to-ground susceptance ($S_{rg}$).

At decision block 312, a check is made of whether the sample line measurements are sufficiently symmetrical. In this context, symmetry implies that the legs of the wires making up the sample line have similar electrical properties. Symmetry may be determined at decision block 312 in any suitable way, such as by taking the absolute value of the difference between the tip-to-ground susceptance and the ring-to-ground susceptance. If this value is less than a threshold, the sample line may be deemed to be symmetrical and measurements made on it may be used in selecting subscriber lines to use in setting CO limits.

However, if the processing at decision block 312 indicates that the sample line is not symmetrical, a faulty configuration of the test system is indicated. Accordingly, the process terminates in an error condition at error exit point 314. In response to such an error condition, one or more corrective actions may be taken. As an example of one corrective action, a repair person may be notified of a potential problem with the installation of the test system and computation of CO limits may be suspended until a manual check of the installation is made.

When the sample line is symmetrical, processing performed at block 320 uses the sample line measurements in computing the filter limits. In some embodiments, the susceptance of the sample line is used to set an upper filter limit. The susceptance of the sample line is taken to be the minimum of the measured tip-to-ground or ring-to-ground and the upper filter limit may be set to equal this value multiplied by a scale factor appropriate for switch 112. Appropriate scale factors may be determined empirically from measurements on prior installations with switches similar to switch 112. As an example, the scale factor may be 1.2 or 1.5, depending on the characteristics of switch 112.

A lower filter limit may also be set at block 320. In one embodiment, the lower filter limit is not set based on measurements on the sample line. Rather, the lower filter limit may be selected based on the characteristics of switch 112. In one embodiment, the specific numerical value of the lower limit is determined from empirical measurements on prior installations with switches similar to switch 112, and may be different for each type of switch.

Once filter limits are set, a series of tests are run on the measurements of the selected subscriber line. If any test fails, the selected subscriber line is deemed unacceptable for use in computing CO limits. These tests begin with the processing shown at decision block 322. At decision block 322, a check is made of whether the measurements made on the selected subscriber line has a signature indicative of a type of equipment that the test system is programmed to identify. In conventional telephone line testing, a test system controller 120 is often programmed to identify whether a line is terminated by certain types of equipment, such as a PBX. Conventional processing may be used at decision block 322 to determine whether the measurements made on the selected subscriber line contain the signature of recognizable equipment. However, any suitable method for detecting a signature may be employed.

Processing then proceeds to decision block 324 where the filter limits computed at block 320 are applied. In this example, the filter limits specify a minimum and maximum value on the ground susceptance of the selected subscriber line. In this context, the ground susceptance is defined to be the minimum of the measured tip-to-ground susceptance and the ring-to-ground susceptance. If the measurements on the selected subscriber line are not within these limits, processing proceeds to termination point B in FIG. 3. As indicated in FIG. 2, termination point B identifies the point in the process of FIG. 2 where a selected subscriber line is deemed not acceptable for computation of CO limits. Conversely, if the measurements on the selected subscriber line fall within the filter limits, processing proceeds to decision block 326.

At decision block 326, a check is made of whether resistive measurements on the selected subscriber line are within predefined limits. Both the resistive measurements and the checks may be made as in a conventional test system. For example, a conventional test system may measure tip-to-ground resistance, ring-to-ground resistance, tip-to-battery resistance, ring-to-battery resistance, tip-to-ring resistance and ring-to-tip resistance. Each of these values should exceed some limit in a properly functioning line. If any of the measured resistances is too low, the selected subscriber line likely contains a resistive fault. For example, the tip-to-battery resistance and ring-to-battery resistance may have a threshold set of 10 MΩ. Acceptable thresholds for each of the measured resistances may be set as in a conventional line test system, but any suitable method of setting thresholds may be used. If any of the measured resistances falls below its corresponding threshold, the process proceeds to termination point B, with the selected subscriber line being identified as unacceptable for use in computing CO limits.

If each of the measured resistances falls within an acceptable range, processing proceeds to decision block 328. At decision block 328, a check is made of whether the measured battery voltage is within acceptable limits. The battery voltage may be measured as in a conventional test system. Likewise, the acceptable limits for the measured battery voltage may be set as in a conventional test system. However, any suitable method for checking the battery voltage associated with a selected subscriber line may be employed. If the check on the battery voltage performed at decision block 328 indicates a battery voltage outside of an acceptable range, processing proceeds to termination point B where the selected subscriber line is indicated to be unacceptable for use in computing CO limits.

If the measured battery voltage is deemed to be acceptable at decision block 328, processing proceeds to decision block 330. At decision block 330, processing branches based on the type of termination detected on the selected subscriber line. Terminations may be determined as in a conventional test system. For example, some test systems compute a ringer equivalence from measurements made on a subscriber line. The ringer equivalence indicates whether a line is unterminated, terminated properly with a subscriber terminal or improperly terminated.

In the process shown in FIG. 3, processing proceeds to decision block 340 when the ringer equivalence measurements indicate that there is no termination on the selected subscriber line. At decision block 340, a check is made of whether the select subscriber line is symmetrical. One or more comparisons may be made to determine symmetry. In the described embodiment, four comparisons are made to determine symmetry. Each comparison must yield a value below a predetermined threshold in order for the selected subscriber line to be deemed symmetrical at decision block 340. In the pictured embodiment, the absolute value of the difference between the tip-to-ground and ring-to-ground susceptance may be used as one indication of symmetry. The absolute value of the difference between the tip-to-ring and ring-to-tip susceptance may be used as a second indication of symmetry. The absolute value of the difference between the tip-to-ground and ring-to-ground conductance may be used as a third indicator of symmetry. The absolute value of the difference between the tip-to-ring and ring-to-tip conductance may be used as a fourth indicator of symmetry. Each of these indicators of symmetry may be compared to a different threshold, with each threshold being set based on the characteristics of switch 112. Each threshold may be determined from historical data collected at other central offices containing similar type switches.

If all of the indicators of symmetry are determined to be within acceptable limits at decision block 340, the process proceeds to termination point A. As shown in FIG. 2, termination point A represents the beginning of processing performed when a line is deemed to be open. Conversely, if one or more of the indicators of symmetry is not within the limits as determined at decision block 340, processing proceeds to termination point B. As shown in FIG. 2, termination point B represents the beginning of processing for selected subscriber lines deemed unacceptable for computing CO limits.

Conversely, if the ringer equivalence determined at decision block 330 indicates that the selected subscriber line is terminated, the process branches in a different direction. When the termination is deemed to be proper, the process branches to decision block 350. At decision block 350, the measurements for the selected subscriber line are used to determine symmetry indicators and compare those symmetry indicators to predetermined limits. As with decision block 340, the symmetry indicators may be the absolute value of the absolute value of the difference between tip-to-ground and ring-to-ground susceptance, the absolute value of the difference between the tip-to-ring and ring-to-tip susceptance, the absolute value of the difference between the tip-to-ground and ring-to-ground conductance and the absolute value of the difference between the tip-to-ring and ring-to-tip conductance. Though the same symmetry indicators may be used in decision blocks 340 and 350, it is not necessary that the thresholds for comparison are the same at each of the decision blocks 340 and 350. Subscriber lines for which measurements are processed at decision block 350 are terminated and therefore extend beyond main distribution frame 114 (FIG. 1). Such lines have greater variability than lines determined to be open and processed at decision block 340. Accordingly, in some, embodiments, the threshold values used as symmetry limits in decision block 350 may be set to allow wider tolerances. Regardless of the specific limits, if the selected subscriber line meets the limits set at decision block 350, processing proceeds to termination point C. As indicated in FIG. 2, termination point C indicates the beginning of processing for a line that is not open, but is otherwise acceptable for computing CO limits.

As a third alternative, if, as determined at decision block 330, the selected subscriber line is improperly terminated, processing proceeds to termination point B. As indicated in FIG. 2, termination point B is the beginning of processing of a line deemed unacceptable for computing CO limits.

Using the processing of FIG. 3, subscriber lines that are open and those that are not open but nonetheless acceptable for computing CO limits are identified. As explained above in connection with FIG. 2, measurements on these lines are used to compute CO limits that may thereafter be applied to improve the accuracy of measurements made with test head 110.

Having thus described several aspects of at least one embodiment of this invention, it is to be appreciated that various alterations, modifications, and improvements will readily occur to those skilled in the art.

For example, embodiments are described in connection with a telephone network that carries voice and high speed data signals. However, the techniques described above more generally may be applied in any setting in which line length estimates are made based on measurements on individual lines.

An example of the invention is described in connection with a test head installed in a central office. However, the invention need not be limited to a test head in such a central office environment. A telephone network may have multiple types of switches, depending on the network architecture. For example, a network may include a DSLAM or other multiplexer.

Further, it is not necessary that the switching system be separate from the distribution system. For example, a distribution frame could be constructed to incorporate a test bus so that a measurement unit could be coupled to individual subscriber lines.

Also, a test system controller is shown attached to one test head. A test system controller may be connected to a network, allowing it to interact with multiple test heads.

Further, a test system controller is shown as a separate hardware element. The test system controller could alternatively be implemented in a computer that serves other functions within the network.

Further, various steps of the described processes may be optional. For example, processing a block 210 (FIG. 2) setting interim CO limits may be omitted.

Also, the order of processing steps may vary from that described. For example, FIG. 3 shows a series of decision blocks 322, 324, 326 and 328, at any one of which a selected subscriber line may be deemed unacceptable based on measurements made. This processing may be performed in any desired order.

Also, in the example embodiments, each subscriber line is formed from a twisted pair of wires, with each leg of the pair labeled as "tip" or "ring," respectively. These designations are for convenience. In some installations, legs of a pair are designated A and B or "leg 1" and "leg 2." The designation of the wires that made up a pair are not critical to the invention.

As an example of another variation, CO limits may be set iteratively. As each open line is identified, CO limits may be recomputed.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," involing, and variations thereof herein, is meant to encompass the items listed thereafter and equivalents thereof as well as additional items.

What is claimed is:

1. A method of provisioning a network with a test system, the test system to connect through a switching system to a distribution point at which a plurality of lines are connected to the switching system, the test system to estimate a length of a selected line of the plurality of lines, the method comprising:
   a) automatically measuring electrical properties on each of a plurality of paths through a switching unit to a distribution point;
   b) automatically selecting a portion of the plurality of the paths, wherein the selected portion of the plurality of the paths includes paths having characteristics indicating that each path is unterminated at the distribution point; and
   c) using the measured electrical properties for the selected portion of the plurality of paths to compute at least one offset value representative of the paths through the switching unit to the distribution point to apply as an offset to measurements of the length of the selected line.

2. The method of claim 1, wherein automatically measuring comprises randomly selecting the order of paths of the plurality of paths for which measurements are made.

3. The method of claim 1, wherein, when the number of paths having characteristics indicating that the path is unterminated is less than a predetermined value, selecting additional paths that are not unterminated at the distribution point.

4. The method of claim 3, further including, determining, for each of the selected additional paths that are not unterminated at the distribution point, whether the path is free of a line fault.

5. The method of claim 1, wherein automatically selecting a portion of the plurality of paths comprises determining, for each of the plurality of paths, whether the path is free of equipment creating a signature of a predetermined type.

6. The method of claim 1, wherein automatically measuring electrical properties consists essentially of making one-ended electrical measurements.

7. A test system adapted to compute a length of a line selected from a plurality of lines, the plurality of lines being connected to a distribution point where the lines are coupled to a switching system, the test system comprising:

a) a measurement unit to:
   i) receive a command identifying a selected line;
   ii) connect through the switching system to the selected line; and
   iii) obtain electrical measurements of the selected line; and
b) a controller, adapted to receive the electrical measurements from the measurement unit, the controller comprising a computer readable medium having computer-executable instructions for performing steps of:
   i) sending a plurality of commands to the measurement unit, each command identifying a different one of the plurality of lines as the selected line;
   ii) receiving from the measurement unit electrical measurements made in response to each of the plurality of commands; and
   iii) computing an offset value from a subset of the electrical measurements made of paths that are unterminated at the distribution point, the offset value being representative of the path between the measurement unit and the distribution point; and
   iv) storing the at least one offset value.

8. The method of claim 7, wherein the computer-executable instructions for computing the offset value comprise computer-executable instructions for comparing a measured resistance to a threshold.

9. The method of claim 7, wherein the computer-executable instructions for computing the offset value comprise computer-executable instructions for comparing a measured battery voltage to a threshold.

10. The method of claim 7, wherein the computer-executable instructions for computing the offset value comprise computer-executable instructions for comparing a measured line symmetry to a threshold.

11. The method of claim 7, wherein the measurement unit is coupled to the distribution point through a sample line and the computer-executable instructions for computing the offset value comprise computer-executable instructions for comparing the electrical measurements to at least one threshold set based on measurements of the sample line.

12. The method of claim 7, wherein the computer-executable instructions for computing the offset value comprise computer-executable instructions for comparing measurements to at least one signature of equipment that could be attached to a line.

13. A computer-readable medium having computer-executable instructions for controlling a test system executed to perform the steps of:
   a) obtaining measurements of electrical properties on each of a plurality of paths through a switching system to a distribution point;
   b) selecting, based on the measurements, at least two of the measurements of paths that are unterminated at the distribution point;
   c) computing at least one offset value representative of the path through the switching system to the distribution point from the at least two selected measurements; and
   d) applying the offset when computing a length of a line connected to the distribution point.

14. The computer-readable medium of claim 13, wherein the computer-executable instructions for controlling the test system to perform the step of selecting comprise computer-executable instructions for selecting measurements of paths that extend beyond the distribution point when the number of paths within the plurality of paths that are unterminated at the distribution point is below a threshold.

15. The computer-readable medium of claim 13, wherein the computer-executable instructions for controlling the test system to perform the step of selecting comprise computer-executable instructions for selecting measurements falling within a predetermined range, the predetermined range being selected based on a type of equipment through which the test system is coupled to the plurality of paths.

16. The computer-readable medium of claim 13, wherein the computer-executable instructions for controlling the test system to perform the step of computing at least one offset value comprise computer-executable instructions for computing a susceptance- to-ground value.

17. The computer-readable medium of claim 16, wherein the computer-executable instructions for controlling the test system to perform the step of computing at least one offset value further comprise computer-executable instructions for computing a pair susceptance value.

* * * * *

UNITED STATES PATENT AND TRADEMARK OFFICE
CERTIFICATE OF CORRECTION

PATENT NO. : 7,602,885 B2  
APPLICATION NO. : 11/322105  
DATED : October 13, 2009  
INVENTOR(S) : Afzal et al.

It is certified that error appears in the above-identified patent and that said Letters Patent is hereby corrected as shown below:

Column 15, Line 23, Claim 8, "The method of claim 7" should read
-- The test system of claim 7 --

Column 15, Line 27, Claim 9, "The method of claim 7" should read
-- The test system of claim 7 --

Column 15, Line 31, Claim 10, "The method of claim 7" should read
-- The test system of claim 7 --

Column 15, Line 36, Claim 11, "The method of claim 7" should read
-- The test system of claim 7 --

Column 15, Line 41, Claim 12, "The method of claim 7" should read
-- The test system of claim 7 --

Signed and Sealed this

Sixteenth Day of February, 2010

David J. Kappos
*Director of the United States Patent and Trademark Office*